(12) United States Patent
Cheung et al.

(10) Patent No.: US 11,880,303 B2
(45) Date of Patent: Jan. 23, 2024

(54) CONTENT CACHE INVALIDATION USING CACHE TAGS

(71) Applicant: Verizon Media Inc., New York, NY (US)

(72) Inventors: Peter Cheung, Redwood City, CA (US); Shu Kit Chan, Foster City, CA (US)

(73) Assignee: Yahoo Ad Tech LLC, New York, NY (US)

( * ) Notice: Subject to any disclaimer, the term of this patent is extended or adjusted under 35 U.S.C. 154(b) by 10 days.

(21) Appl. No.: 17/565,523

(22) Filed: Dec. 30, 2021

(65) Prior Publication Data
US 2023/0214324 A1 Jul. 6, 2023

(51) Int. Cl.
*H04L 67/5682* (2022.01)
*G06F 12/0808* (2016.01)

(52) U.S. Cl.
CPC ...... *G06F 12/0808* (2013.01); *H04L 67/5682* (2022.05)

(58) Field of Classification Search
CPC ....... H04L 67/56; H04L 67/568; H04L 67/01; H04L 67/1095; H04L 67/1097; H04L 67/5682; G06F 3/067; G06F 16/957; G06F 16/9574; G06F 16/172; G06F 12/0808; G06F 12/0815
See application file for complete search history.

(56) References Cited

U.S. PATENT DOCUMENTS

| | | | | |
|---|---|---|---|---|
| 2001/0042073 A1* | 11/2001 | Saether | ................. | G06F 16/182 707/999.203 |
| 2003/0182357 A1* | 9/2003 | Chess | ................. | G06F 16/9574 709/230 |
| 2008/0229024 A1* | 9/2008 | Plamondon | ............. | H04L 67/56 709/218 |
| 2014/0330924 A1* | 11/2014 | Lientz | ..................... | H04L 67/06 709/213 |
| 2014/0344391 A1* | 11/2014 | Varney | ................. | H04L 65/612 709/213 |
| 2015/0100660 A1* | 4/2015 | Flack | .................. | H04L 67/1095 709/213 |
| 2015/0180733 A1* | 6/2015 | Krutzler | .................. | H04L 67/02 709/219 |
| 2018/0060431 A1* | 3/2018 | Acharya | ............... | G06F 16/958 |
| 2020/0076873 A1* | 3/2020 | Panzer | .................. | G06F 16/972 |
| 2020/0250102 A1* | 8/2020 | Khan | .................. | G06F 12/0893 |
| 2020/0366954 A1* | 11/2020 | Crowder | ............ | H04L 67/2885 |

\* cited by examiner

*Primary Examiner* — Johnny B Aguiar
(74) *Attorney, Agent, or Firm* — Cooper Legal Group LLC

(57) ABSTRACT

One or more computing devices, systems, and/or methods for content cache invalidation using cache tags are provided. A first proxy hop may receive a request from a client device for a content object originating from a content source. A cache tagging script is executed to add a query parameter to the request to create a modified request. The query parameter specifies a cache tag version for the content object. The modified request is transmitted through one or more subsequent proxy hops to the content source to retrieve the content object. The content object, tagged with a cache tag specifying the cache tag version, is cached as a cached content object within a cache. The cache tag is associated with an expiration timestamp after which the cached content object is designated to be invalid.

20 Claims, 12 Drawing Sheets

CONTENT CACHE INVALIDATION USING CACHE TAGS

BACKGROUND

Content delivery platforms may provide users with access to various types of content objects, such as webpages, images, articles, music, videos, and/or other types of content. A content object may be available from a content source, such as where a website hosting platform may publish a webpage that is accessible to clients through a web browser. When a client requests the webpage, the request may be received by a first proxy hop that may be a client facing proxy hop of the content delivery platform. For example, the first proxy hop may be a client facing server, router, networking equipment, hardware, or software of the content delivery platform. There may be multiple proxy hops from the first proxy hop to the website hosting platform. In order to improve performance and provide content objects to client devices in an efficient and performant manner, the content delivery platform may cache content objects, such as the webpage, within caches of the proxy hops so that a cached content object may be provided to a client without having to access the content source.

SUMMARY

In accordance with the present disclosure, one or more computing devices and/or methods for content cache invalidation using cache tags are provided. A content source may publish a content object that may be accessible to client devices through a content delivery platform. The content object may be an image, a video, a webpage, an article, a song, or any other type of content. The content delivery platform may comprise multiple proxy hops, such as servers or other software or hardware devices, between the client devices and the content source. In order to improve throughput of serving a content object to client devices, the proxy hops may cache the content object, such as where a server may cache a webpage in memory. Thus, when a client device requests the content object, a cached version of the content object may be quickly provided to the client device without having to obtain the content object from the content source. When a new version of the content object is made available by the count source (e.g., the webpage may be updated with a new story, and thus the cached webpage may be stale), the cached content objects may become stale. Because the content object may be cached at multiple proxy hops within the content delivery platform, invalidating stale cached content objects is non-trivial, error prone, and difficult.

As provided herein, cache tags are used to invalidate content objects across the proxy hops within the content delivery platform in an efficient manner. The proxy hops may implement a cache tagging mechanism that includes a cache tagging script and a cache tag configuration override script used for cache invalidation. In an example, a first proxy hop may receive a request from a client device for a content object originating at a content source. The request and/or any other request received by the first proxy hop may be assigned a default cache tag with a default cache tag version (e.g., integer 1 or some other value). The first proxy hop may execute the cache tagging script to determine whether the default cache tag should be overridden using an override cache tag and/or for how long the default cache tag should be overridden (an override expiration). The cache tagging scripts performs a check for the request Uniform Resource Locator (URL) by looking up a configuration to see if a cache tag override should be performed. So, for every request URL, there will either be a default cache tag assigned over a cache tag override is to be performed. The configuration specifies when the cache tag override is to start and for how long to use the override cache tag.

If the default cache tag is overridden with the override cache tag having the cache tag version for a period of time until the override expiration, then the cache tag will revert back to the default cache tag. The override expiration is implemented so that a stale cached copy with an old cache tag would be evicted by the time the expiration is reached. For example, if the max age of a stale cached object is 10 seconds, then the override expiration can be set to >=10 seconds to that by the time a reversion back to the default cache tag is performed, the old stale copy is already gone. Thus, a next fetch from the content source will be performed to obtain the latest version.

In an example, a request https://foobar.com/abc/xyz received by the first proxy hop. The first proxy hop assigns a default cache tag of 1. The request is forwarded to the subsequent hops and becomes https://foobar.com/abc/xyz?ctv=1. If there is an update at the content source for https://foobar.com/abc/xyz, then a cache tag override of 2 is specified to ensure that a latest copied of the content is retrieved and served. When the same request https://foobar.com/abc/xyz is requested again at the first proxy hop, the request is updated to be https://foobar.com/abc/xyz?ctv=2. From the viewpoint of subsequent proxy hops, the request is actually a different request because the request URL is different (query parameter list is different). This means the cache key is different too. Cache tags are overridden until the specified expiration. After the expiration, a reversion back to using the default cache tag version is performed. At this point, all cached stale copies of the content item should be evicted from caches.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
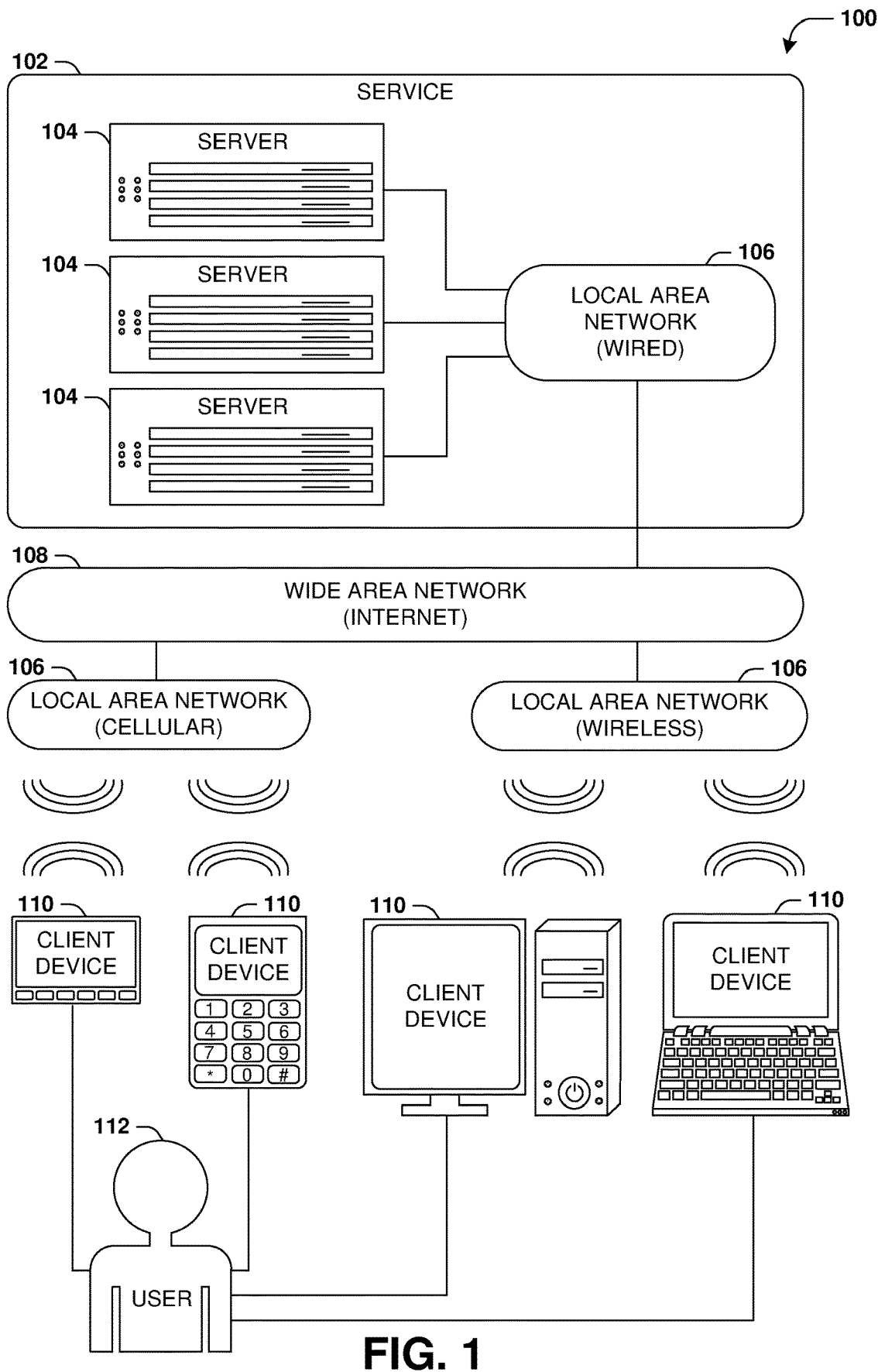
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
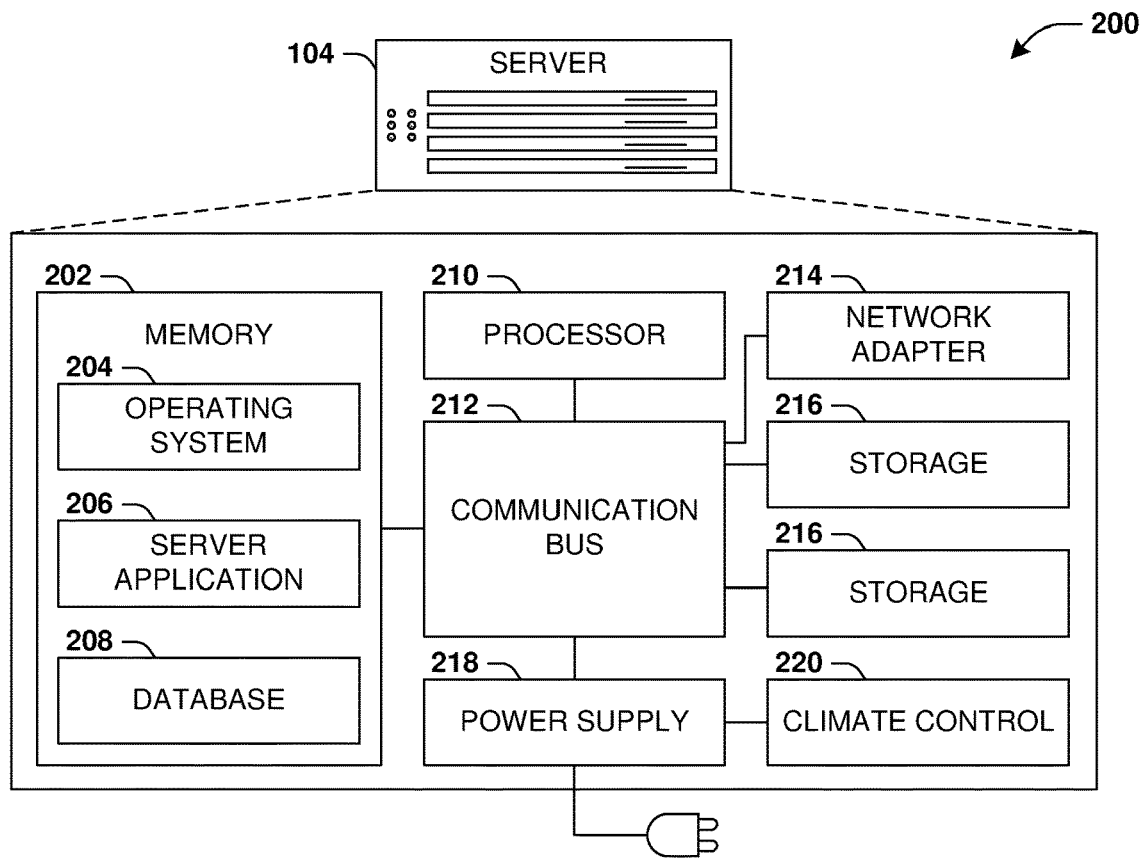
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
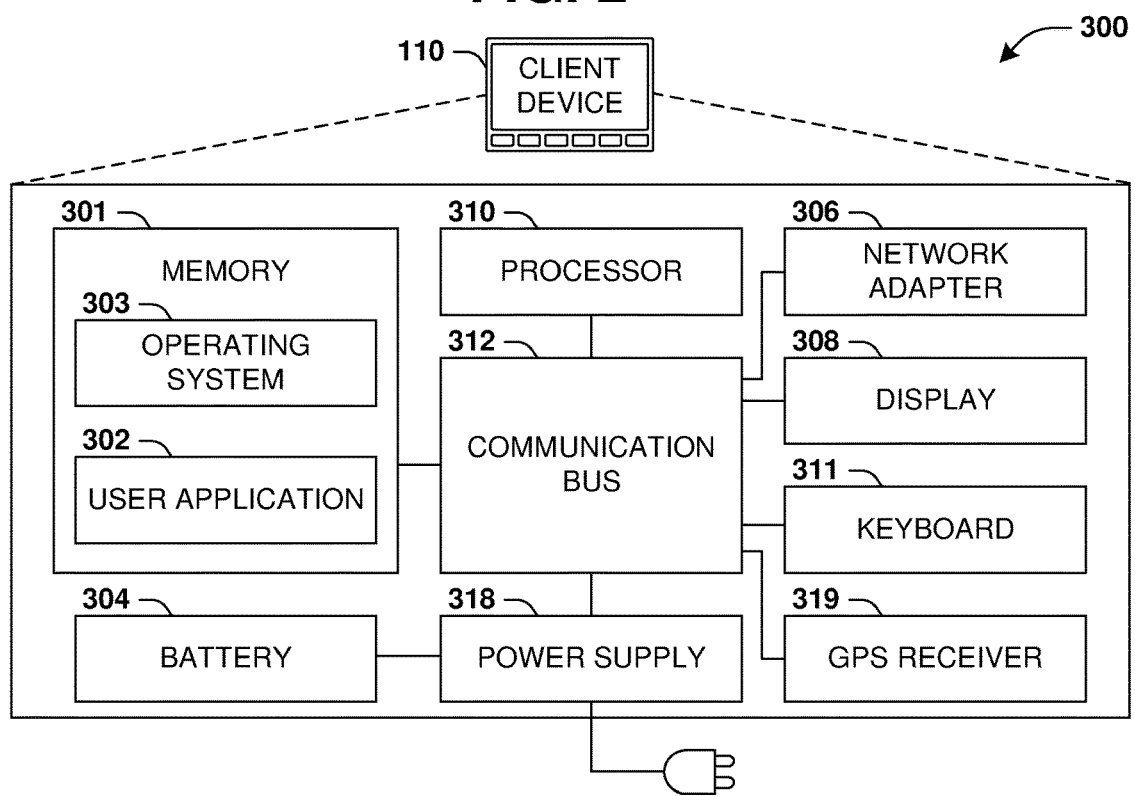
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for content cache invalidation using cache tags are provided. Content objects, such as images, videos, webpages, articles, songs, or any other type of content, may be made accessible by content sources (e.g., a social network provider, an image sharing service, a website provider, etc.) to client devices through a content delivery platform. The content delivery platform may comprise multiple proxy hops, such as servers or other software or hardware devices, between the client devices and the content sources. In order to improve throughput of serving the content objects to the client devices, the proxy hops may cache the content objects (e.g., a server may cache a webpage in memory). Thus, when a client device requests a content object, a cached version of the content object may be quickly provided to the client device without having to obtain the content object from a content source.

Over time, new versions of the content object may become available from the content source. For example, the webpage may be updated with new content, images, and articles over time. Thus, the previously cached versions of the webpage become stale with old/stale content, images, and articles. Invalidating these cached versions is difficult, error prone, and consumes a lot of resources to locate and invalidate all stale cached copies because the stale cached copies could be located with numerous caches of proxy hops within the content delivery platform. The proxy hops may be servers that can be located in different data centers, which requires a lot of manual coordination and management to locate and invalidate (remove/flush) stale cached content objects.

In an example of attempting to invalidate stale cached content objects, a content object may relate to an image that may have been resized or modified into multiple cached copies scattered across multiple proxy layers (proxy hops). To invalidate the cached resized/modified copies of the image, an administrator must construct cache lookup URLs that correspond to the image URLs. These cache lookup URLs can be different from the image URLs due to request transformations made by tenant code of a multi-tenant environment corresponding to the content delivery platform. The cache lookup URLs may have additional query parameters not present in the original image URLs due to a varying response headers from application origins. The administrator must then prepare to issue special purge requests with these cache lookup URLs from local host interfaces for security reasons. This preparation can become complicated if the proxies are deployed in heterogeneous environments such as where there is a mix of different storage devices and/or Kubernete pods. The purge requests must be issued in a correct order starting from a proxy layer (proxy hop) closest to the source images (the content source). These steps are error prone and the purge requests must be issued on all participating proxy layers.

The systems and/or techniques provided herein for content cache invalidation using cache tags are capable of streamlining and simplifying cache invalidation compared to these prior attempts that are complex, error prone, and involve a substantial amount of administrative management. In particular, cached content objects are invalidated on proxy hops by introducing cache tags that can be associated with expiration timestamps. The cache tags are in the form of implicit additional query parameters that are added to incoming requests for content objects from client devices at a first proxy hop (e.g., a client facing server/proxy layer). By updating the cache tags on specific incoming requests, this signifies that cached content objects tagged with prior cache tag versions will no longer be referenced. This results in implicit invalidation of all cached content objects across multiple proxy hops (proxy layers) without having to coordinate cache flushing operations across the multiple proxy hops, thus reducing human errors, greatly simplifying cache invalidations, and speeding up cache invalidation requests.

These techniques for content cache invalidation may be implemented to label cached objects without modifying content sources (origins/provides of objects) and/or without modifying clients making requests for objects. Thus, both the clients and the content sources do not need to be modified to understand the notion of cache tags. This is because cache tags are implicit modifications to incoming requests. In this way, there is no need to implement a full versioning content management system, which would additionally require new proxies and the reuse of existing proxy caching mechanisms. In order to lookup cached objects in a proxy, request information is used to compose a cache key used to lookup the cached object. A request comprises a request method (GET/POST/PUT/DELETE, etc.) and a request URL that may also include query parameters. Accordingly, a cache tagging script that adds a cache tag query parameter is modifying the cache key. This same cache tag query parameter is propagated to subsequent proxies so that the proxies can distinguish between different cached objects. The content sources (origins) do not perform actions on the additional query parameters, and thus the content sources continue to provide the latest version of objects.

Figure 4:
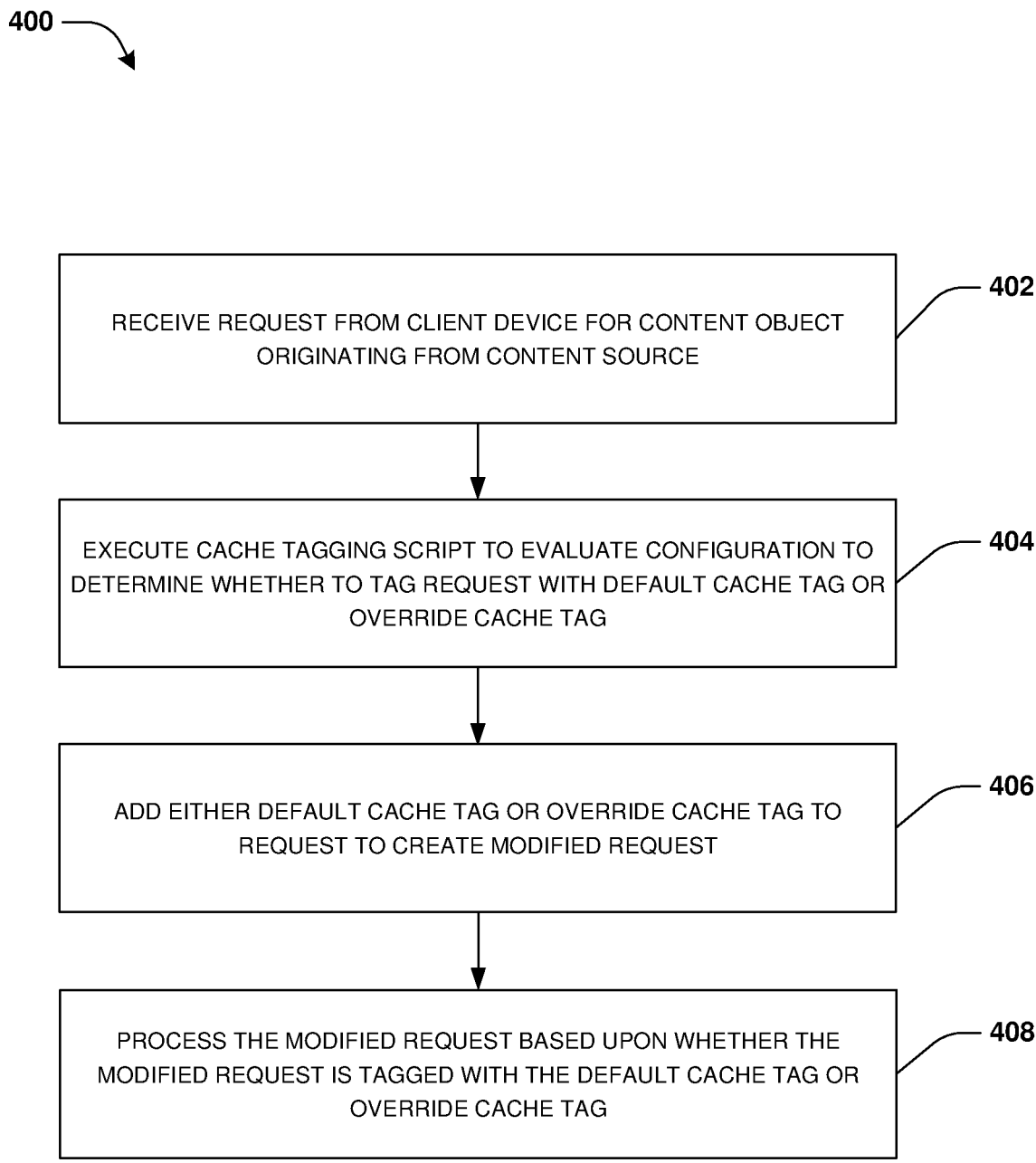
FIG. 4 is a flow chart illustrating an example method for content cache invalidation using cache tags.
Figure 5:
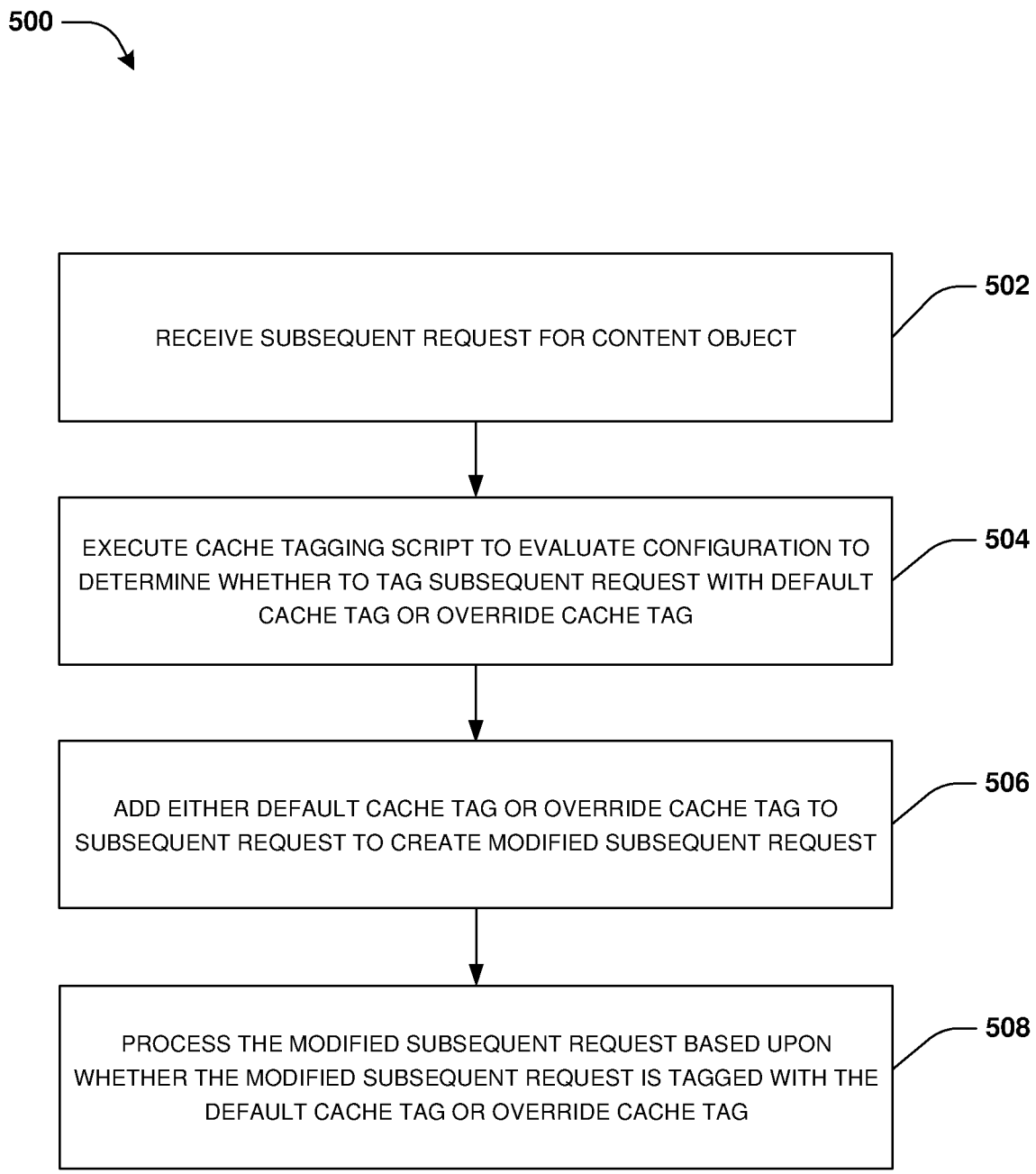
FIG. 5 is a flow chart illustrating an example method for content cache invalidation using cache tags.

One embodiment of content cache invalidation using cache tags is illustrated by an exemplary method 400 of FIG. 4 and an exemplary method 500 of FIG. 5 and is further described in conjunction with system 600 of FIGS. 6A-6G. The system 600 may correspond to a content delivery network. The content delivery network may be comprised of proxy hops, such as proxy layers. In some embodiments, the proxy hops may be hosted on or as servers, nodes (e.g., Kubernete nodes), virtual machines, hardware, software, or combinations thereof. In some embodiments, the proxy hops may be hosted in the same or across multiple data centers. In some embodiments, the content delivery network may be associated with a multi-tenant environment. Tenants of the multi-tenant environment may correspond to content sources (e.g., website publishers, social network providers, storage services, email services, image sharing services, media providers, etc.) and/or clients that consume content objects provided by the content sources.

A cache tagging mechanism may be implemented for the content delivery network. The cache tagging mechanism may be used to efficiently invalidate stale cached content objects within caches of the proxy hops when a newer version of a content object becomes available from a content source. In some embodiments, a tenant (e.g., a content source) may opt-in to utilizing the content caching mechanism. Accordingly, a cache tagging script and a cache tag configuration override script of the content caching mechanism will be used by the proxy hops to process requests from clients that are directed to content objects available from the content source that has opted in to using the content caching mechanism.

Figure 6A:
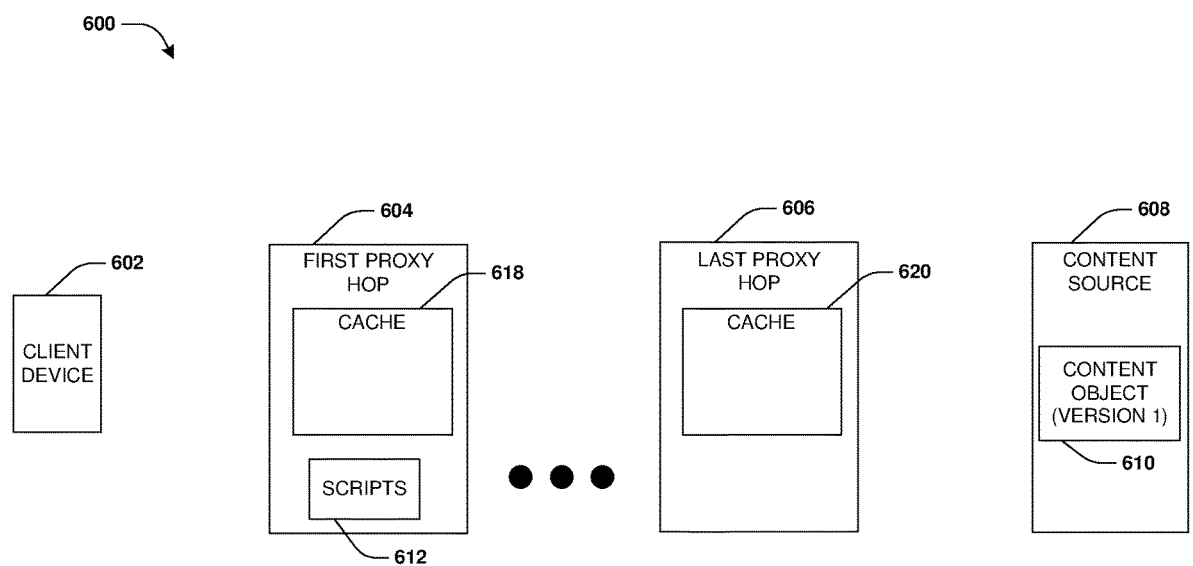
FIG. 6A is a component block diagram illustrating an example system for content cache invalidation using cache tags.

In some embodiments, the content delivery network comprises a first proxy hop 604, one or more subsequent proxy hops (not illustrated), and a last proxy hop 606, as illustrated by FIG. 6A. The first proxy hop 604 may comprise a cache 618, such as memory, within which the first proxy hop 604 may cache content objects so that the cached content objects may be provided to client devices without having to retrieve the content objects from content sources, thus improving throughput. Similarly, the last proxy hop 606 may comprise a cache 620, such as memory, within which the last proxy hop 606 may cache content objects so that the cached content objects may be provided to client devices without having to retrieve the content objects from content sources, thus improving throughput. Other proxy hops, such as the one or more subsequent proxy hops, may also have caches used to cache content objects.

The first proxy hop 604 may be a client facing proxy hop with which a client device 602 interacts. The last proxy hop 606 may be a final proxy hop within the content delivery network before reaching a content source 608, such as a website provider that provides video game news a videogame website (a content object). The first proxy hop 604 may comprise scripts 612, such as the cache tagging script and the cache tag configuration override script. The scripts 612 may be used by the content caching mechanism in order to efficiently invalidate stale cached content objects of the videogame website within caches of the proxy hops when a newer version of the videogame website (e.g., a new videogame gameplay image has now been added to the videogame website) becomes available from the content source 608. In some embodiments, cache tagging and override scripts (scripts 612) may merely reside at the first proxy hop 604. Once the first proxy hop 604 modifies an incoming request (a request without the notion of cache tags), the request is modified with a default cache tag, which may be overridden with a cache tag having a different cache tag version than the default cache tag version, if applicable. This modified request is transmitted to subsequent proxy hops. In some embodiments, these subsequent proxy hops do not need to check cache tags because cache lookups are generally to compose cache keys based upon incoming requests. Thus, for subsequent proxy hops, the requests are already modified by the first proxy hop 604.

When the content source 608 initially publishes the videogame website (a content object with an initial version of 1) for access by client devices, the first proxy hop 604, the one more subsequent proxy hops, and the last proxy hop 606 will not have the videogame website cached within the caches of the proxy hops. As client devices request the videogame website (content object), then the proxy hops may cache the videogame website as cached content objects.

Figure 6B:
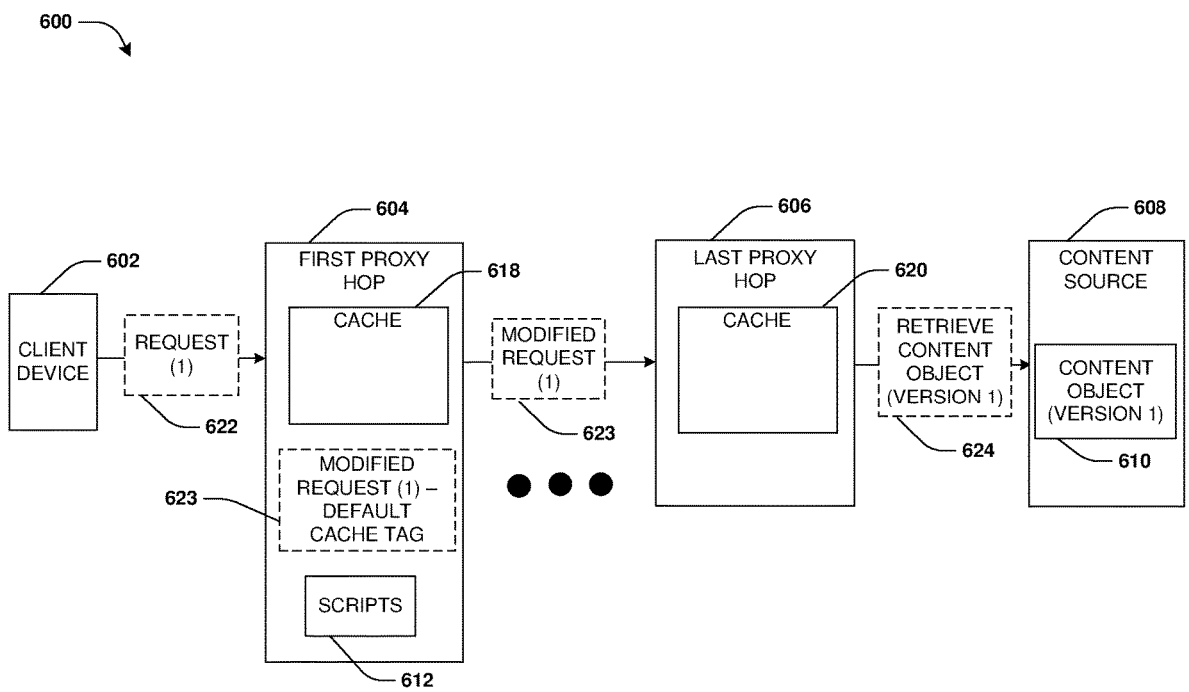
FIG. 6B is a component block diagram illustrating an example system for content cache invalidation using cache tags, where a request for a content object is processed.

During operation 402 of the method 400, the first proxy hop 604 may receive a first request 622 from the client device 602 for a content object originating from the content source 608, such as the videogame website, as illustrated by FIG. 6B. The first request 622 may comprise a URL of the videogame website provided by the content source 608. The current version of the content object 610 may be version 1. During operation 404 of the method 400, the first proxy hop 604 may execute the scripts 612 such as the cache tagging script in order to evaluate to a configuration to determine whether to tag the first request 622 with a default cache tag or an override cache tag. In some embodiments, the scripts 612 may be executed to add a query parameter to the first request 622 to create a modified first request 623. The query parameter of the modified first request 623 may specify a cache tag version of the content object 610. The cache tag version may correspond to either the default cache tag or the override cache tag. In this way, during operation 406 of the method 400, either the default cache tag or the override cache tag is added to the first request 622.

Because a cached content object is not within the cache 618 of the first proxy hop 604, the modified first request 623 may be transmitting through the one or more subsequent proxies and the last proxy hop 606 to the content source 608 in order to retrieve the content object 610, during operation 406 of the method 400. Because the one or more subsequent proxy hops do not have a cached content object with the default cache tag within their caches, the modified first request 623 is routed to the last proxy hop 606. The last proxy hop 606 may determine that a cached content object with the default cache tag is not within the cache 620. Accordingly, the last proxy hop 606 may remove the query parameter from the modified first request 623, which is then issued as a content object retrieval request 624 by the last proxy hop 606 to the content source 608 in order to retrieve the latest version of the content object 610. The query parameter may be removed from the modified first request 623 before the modified first request 623 is issued as the content object retrieval request 624 to the content source 608 so that the content caching mechanism may be transparent to the content source 608. In this way, the modified first request 623 is processed based upon whether the modified first request 623 is tagged with the default cache tag or the override cache tag.

Figure 6C:
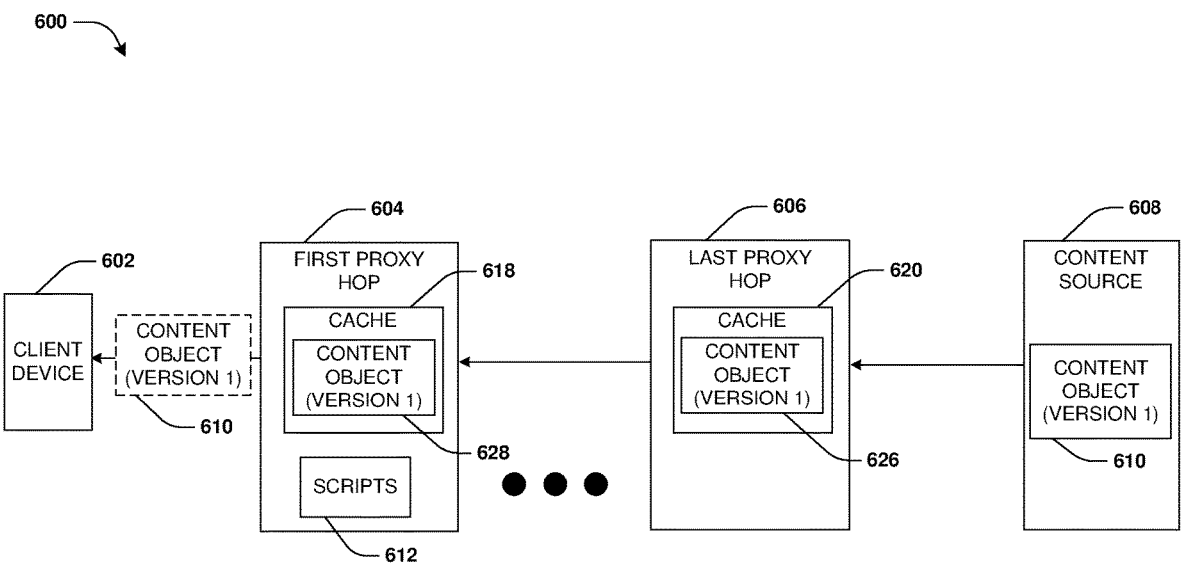
FIG. 6C is a component block diagram illustrating an example system for content cache invalidation using cache tags, where a content object is cached.

The content object 610 is cached by the proxy hops as cached content objects within the caches of the proxy hops, as illustrated by FIG. 6C. For example, when the last proxy hop 606 receives the content object 610 from the content source 608, the last proxy hop 606 creates a cached content object 626 comprising the content object 610 tagged with default cache tag. The cached content object 626 is stored within the cache 620 of the last proxy hop 606. The one or more subsequent proxy hops may also cache the content object 610 as cached content objects comprising the content object 610 tagged with the default cache tag. When the first proxy hop 604 receives the content object 610, the first proxy hop 604 creates a cached content object 628 comprising the content object 610 tagged with the default cache tag. The cached content object 628 is stored within the cache 618 of the first proxy hop 604. The first proxy hop 604 provides the content object 610 with the version 1 (e.g., the videogame website with an article about a new videogame) to the client device 602.

In some embodiments, an expiration timestamp may be associated with the cache tag used to tag the cached content objects. The cached content objects may be designated as being invalid upon expiration of the expiration timestamp. For example, the expiration timestamp may be set to 5 days. After the 5 days has expired, then the cached content objects with the cache tag having the expiration timestamp are designated as invalid. These cached content objects that are invalid will not be served to clients. Also, these cached content objects that are invalid may be removed from the caches of the proxy hops. Thus, the next time the proxy hops receive requests for the content object that is not cached within their caches, the proxy hops will retrieve and cache a latest version of the content object within their caches.

In some embodiments, a default cache tag may be used for the content object, which may be overridden as new versions of the content object become available. If an expiration timestamp of a current cache tag assigned to a cached content object has expired, then the cache tagging script may revert back from utilizing the current cache tag to utilizing the default cache tag.

When a client device such as the client device 602 or a different client device requests the content object such as the videogame website, then a cached content object can be provided from a cache of a proxy hop to the client device if the cached content object is a latest version of the content object being requested. This is determined using the cache tag configuration override script.

In some embodiments, a start time and an expiration timestamp are associated with a cache tag override in a configuration. Expiration is set to be greater than or equal to a max time-to-live of a cached content object. This is done to ensure that any previously cached content objects that do not correspond to the latest content source version of the content object would not be referenced or served, and would be evicted/invalidated by content proxy caching mechanisms.

Figure 6D:
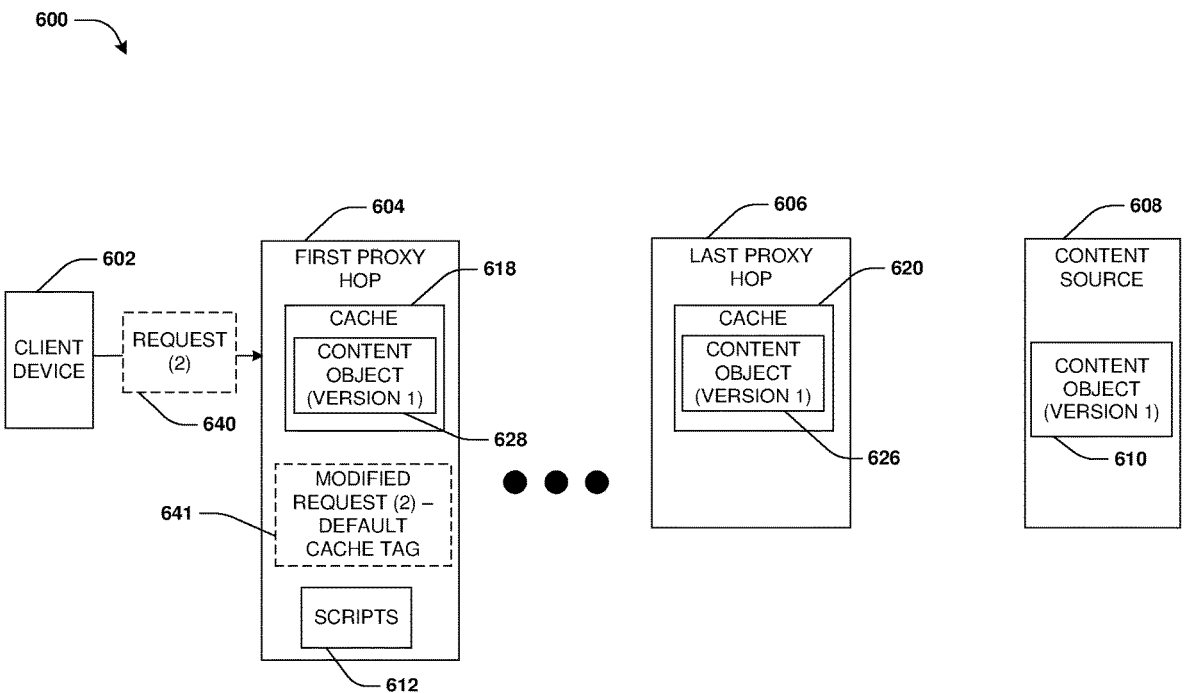
FIG. 6D is a component block diagram illustrating an example system for content cache invalidation using cache tags, where a request for a content object is processed.

In some embodiments of implementing the cache tag configuration override script, a second request 640 (a subsequent request to the first request 622) may be received from the client device 602 by the first proxy hop 604, as illustrated by FIG. 6D. The second request 640 may comprise a URL for the videogame website. During operation 502 of the method 500, the first proxy hop 604 receives the second request 640 from the client device 602 for the content object (e.g., a latest version of the videogame website). In response to the first proxy hop 604 receiving the second request 640 from the client device 602, the first proxy hop 604 may execute the cache tag configuration override script (scripts 612), during operation 504 of the method 500. The cache tag configuration override script may be executed by the first proxy hop 604 to evaluate the configuration to determine whether to tag the second request 640 with the default cache tag or the override cache tag, during operation 506 of the method 500.

Figure 6E:
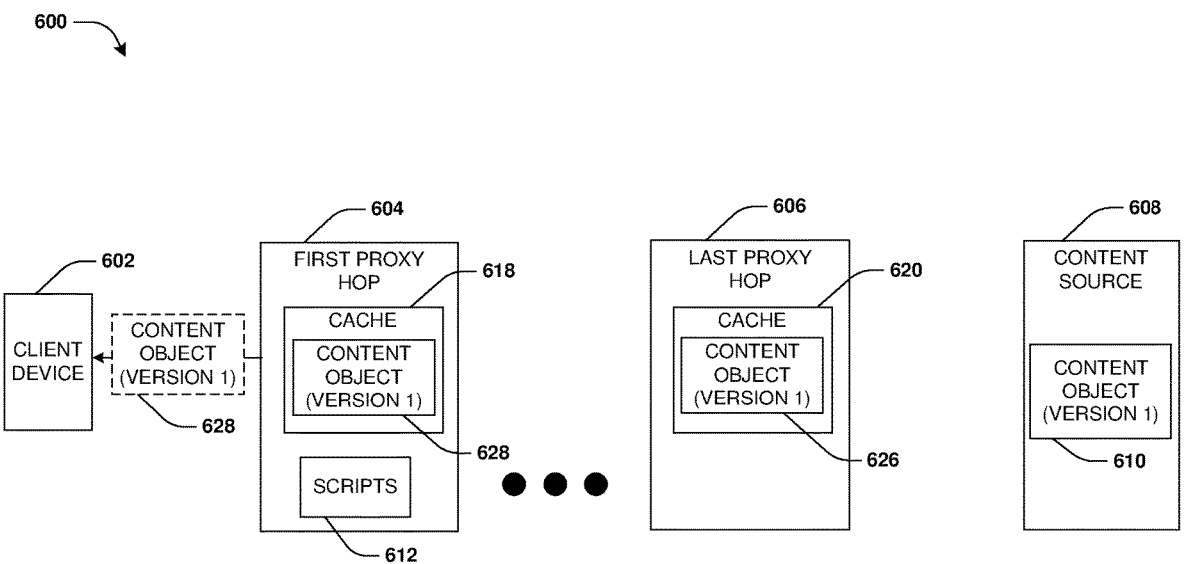
FIG. 6E is a component block diagram illustrating an example system for content cache invalidation using cache tags, where a cached content object is provided to a client device.

In some embodiments, the cache tag configuration override script may tag the second request 640 with the default cache tag 641 to create a modified second request 641, as illustrated by FIG. 6E. For example, the latest version of the videogame website has not changed since the videogame website was cached within the cache 618 of the first proxy hop 604 as the cached content object 628, cached within the cache 620 of the last proxy hop 606 as the cached content object 626, and/or cached within caches of subsequent proxy hops between the first proxy hop 604 and the last proxy hop 606. In this way, the first proxy hop 604 provides the cached content object 628 to the client device 602 in response to the second request 640 as part of processing the modified second request 641, during operation 508 of the method 500.

At a subsequent point in time from processing the second request 640, the content source 608 may update the videogame website with new images and text, thus creating a content object 652. This results in the cached content object 628, the cached content object 626, and/or other cached content objects becoming stale because these cached content objects do not comprise the new images and text of the updated videogame website corresponding to the content object 652. The content source 608 may update the configuration at the first proxy hop 604 to indicate that a cache version override is to be performed.

Figure 6F:
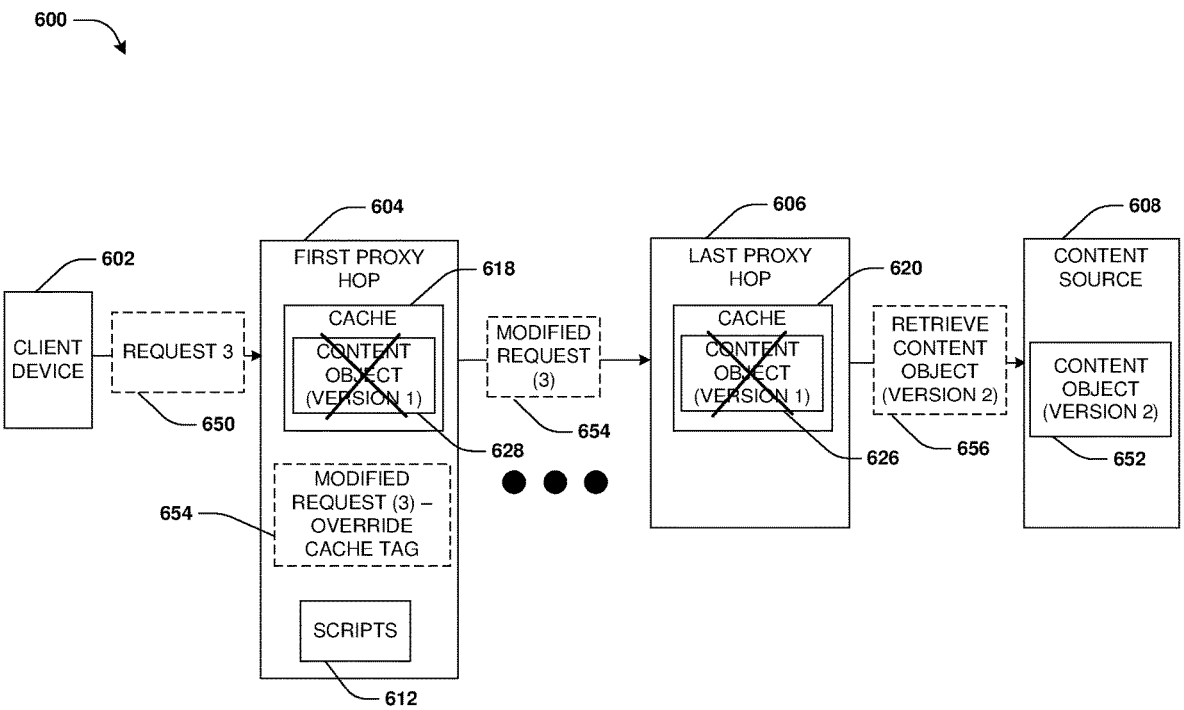
FIG. 6F is a component block diagram illustrating an example system for content cache invalidation using cache tags, where a request for a content object is processed and cached content objects are invalidated.

After the content source 608 has created with content object 652 (e.g., the updated videogame website), the content source will update and provide the configuration at the first proxy hop 604 to indicate that cache tag override is to be implemented for content links that have been updated. The first proxy hop 604 may receive a third request 650 from the client device 602 or other client device, as illustrated by FIG. 6F. The third request 650 may request access to the videogame website provided by the content source 608 (e.g., the third request 650 may comprise a URL for the videogame website). In response to receiving the third request 650 from the client device 602 for access to the videogame website, the first proxy hop 604 may execute the cache tag configuration override script (scripts 612). The cache tag configuration override script may evaluate the configuration to determine that an override cache tag version is to be used to tag the third request 650. In an example, the cache tag configuration override script may perform a lookup of a tuple by a request URL of the third request 650 (e.g., the URL of the videogame website that was included in the third request 650). The tuple may comprise a starting timestamp of when a cache tag override should apply (e.g., starting time for overriding the default cache tag), a duration of the cache tag override (e.g., a cache tag different than the default cache tag is valid for 3 days), and a cache tag override value. In this way, the cache tag configuration override script tags the third request 650 with the override cache tag to create the modified third request 654.

The creation of the new query parameter and thus the use of the default cache tag effectively invalidates all cached content objects, within caches of the first proxy hop 604, the last proxy hop 606, and/or the subsequent proxy hops, that have cache tags specifying cache tag versions prior to the new cache tag version of 2 that corresponds to the latest version of the content object 652 having the version of 2. For example, the cached content object 628 within the cache 618 of the first proxy hop 604, the cached content object 626 within the cache 620 of the last proxy hop 606, and/or other cached content objects having the cache tags will not be served to clients. Accordingly, these content objects may be evicted from the caches so that the next time the proxy hops receive a request for the content item at some point in time before expiration of a timespan during which the override cache tag is being used, the proxy hops will proceed to obtain the latest version of the content object 652 from the content source 608.

The new query parameter of the modified third request 654 may specify the override cache tag. The modified third request 654 may be transmitting through the one or more subsequent proxies and the last proxy hop 606 to the content source 608 to retrieve the latest version of the content object 652 having the version of 2. Because the one or more subsequent proxy hops do not have a cached content object with the override cache tag, the modified third request 654 is routed through the subsequent proxy hops to the last proxy hop 606. While each subsequent proxy hop is processing the modified third request 654, any cached content objects with cached tags specifying prior/older cache tag versions may be invalidated and/or removed from caches of the subsequent proxy hops. In this way, the use of the cache tag override will invalidate cached content objects at caches hosted by the proxy hops of the content delivery network based upon the cached content objects being tagged with cache tags having prior/older cache tag versions.

The last proxy hop 606 may determine that there are no cached content objects in the cache 620 that have override cache tag. The last proxy hop 606 may invalidate and/or remove the cached content object 626 having the default cache tag from the cache 620 because the modified third request 650 specifies the new query parameter with the override cached tag. Accordingly, the last proxy hop 606 may remove the new query parameter from the modified third request 650, which is then issued as a content object retrieval request 656 by the last proxy hop 606 to the content source 608 in order to retrieve the latest version of the content object 610. The query parameter may be removed from the modified third request 650 before the modified third request 650 is issued as the content object retrieval request 656 to the content source 608 so that the content caching mechanism may be transparent to the content source 608

Figure 6G:
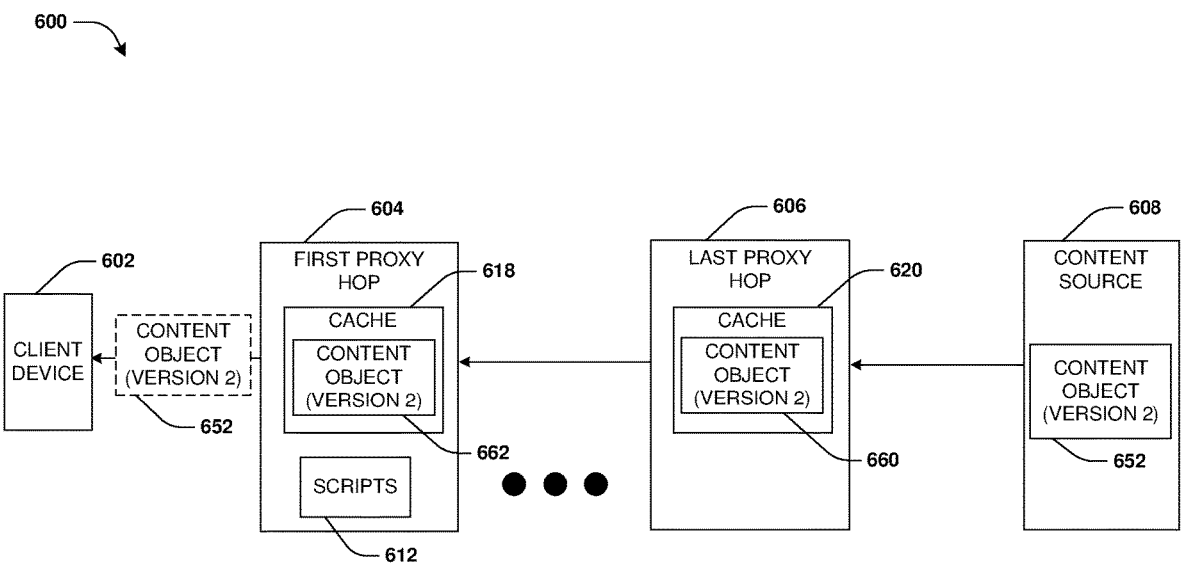
FIG. 6G is a component block diagram illustrating an example system for content cache invalidation using cache tags, where a new version of a content object is provided to a client device.

The latest version of the content object 652 may be transmitted from the last proxy hop 606, through the subsequent proxy hops, to the first proxy hop 604. Each proxy hop may cache the latest version of the content object 652 with cache tags, as illustrated by FIG. 6G. For example, the last proxy hop 606 may cache the latest version of the content object 652 as a cached content object 660 tagged with a cache tag 2. The first proxy hop 604 may cache the latest version of the content object 652 as a cached content object 662 tagged with a cache tag. The first proxy hop 604 may provide the latest version of the content object 652 to the client device 602 in response to the third request 650.

As requests are received by the proxy hops, the scripts hosted by the proxy hops (e.g., scripts 612 hosted by the first proxy hop 604) may be dynamically reloaded on-demand in order to determine whether cached content objects should be invalidated or not. For example, the cache tagging script may be dynamically reloaded on-demand by the proxy hops in order to assign query parameters to requests, create cache tag versions, and/or assign cache tags to cached content objects. The cache tag configuration override script may be dynamically reloaded on-demand to determine whether to tag incoming requests with a default cache tag or an override cache tag.

Figure 7:
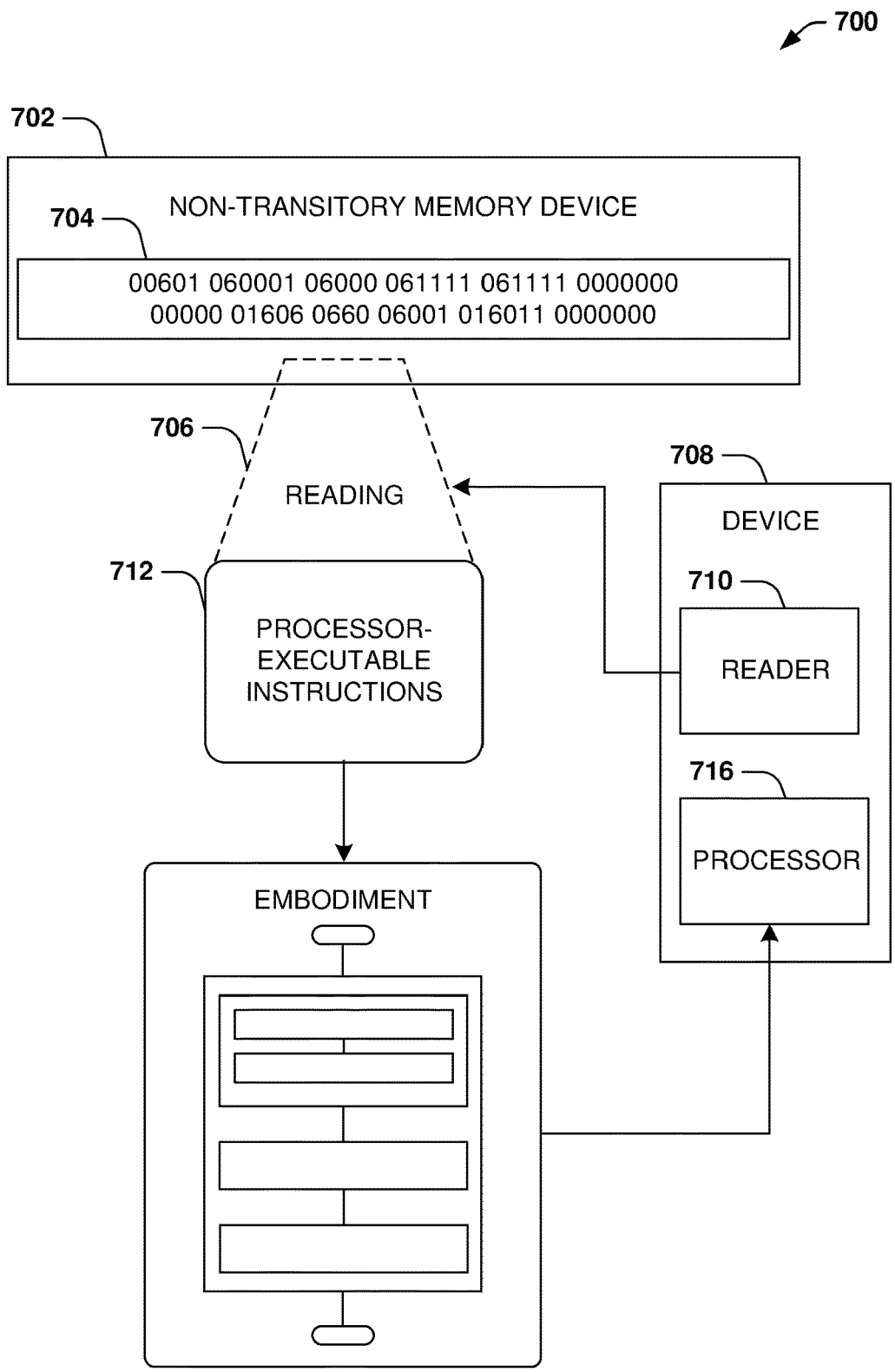
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 400 of FIG. 4 and/or at least some of the example method 500 of FIG. 5, for example. In some embodiments, the processor-executable instructions 712 are configured to cause implementation of a system, such as at least some of the example systems 600 of FIGS. 6A-6G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:
1. A method, comprising:
   executing, on a processor of a computing device, instructions that cause the computing device to perform operations, the operations comprising:
      receiving, at a first proxy hop, a request from a client device for a content object originating from a content source;
      executing a cache tagging script to add a query parameter specifying a cache tag version for the content object to the request to create a modified request;

transmitting the modified request through one or more subsequent proxy hops to the content source to retrieve the content object;
caching the content object, tagged with a cache tag specifying the cache tag version, as a cached content object within a cache; and
in response to receiving, at the first proxy hop, a subsequent request for the content object:
determining a request Uniform Resource Locator (URL) of the content object included in the subsequent request; and
executing a cache tag configuration override script to (i) perform a lookup of a tuple by the request URL of the subsequent request and (ii) tag the subsequent request with an override cache tag to create a modified subsequent request, wherein the tuple for which the lookup was performed by executing the cache tag configuration override script comprises a starting timestamp of when a cache tag override should apply, a duration of the cache tag override, and a cache tag override value.

2. The method of claim 1, comprising:
associating an expiration timestamp with the cache tag; and
designating the cached content object as invalid upon expiration of the expiration timestamp.

3. The method of claim 1, comprising:
in response to receiving, at the first proxy hop, the subsequent request for the content object, executing the cache tag configuration override script to determine whether the cache tag version corresponds to a latest version of the content object; and
in response to the cache tag configuration override script determining that the cache tag version does not correspond to the latest version of the content object, assigning a new query parameter specifying a new cache tag version for the content object to the subsequent request to create the modified subsequent request.

4. The method of claim 3, comprising:
invalidating copies of the cached content object within the cache and caches of the one or more subsequent proxy hops based upon the new cache tag version not matching the cache tag version of the copies of the cached content object.

5. The method of claim 3, comprising:
transmitting the modified subsequent request through the one or more subsequent proxy hops to the content source to retrieve the latest version of the content object; and
caching the latest version of the content object, tagged with a new cache tag specifying the new cache tag version, as a new cached content object within the cache.

6. The method of claim 1, comprising:
in response to receiving, at the first proxy hop, the subsequent request for the content object, executing the cache tag configuration override script to determine whether the cache tag version corresponds to a latest version of the content object; and
in response to the cache tag configuration override script determining that the cache tag version corresponds to the latest version of the content object, returning the cached content object from the cache for the subsequent request.

7. The method of claim 1, comprising:
in response to determining that a newer version of the content object is available from the content source, creating a new cache tag version to invalidate cached content objects of the content object having prior cache tag versions.

8. The method of claim 1, comprising:
specifying a default cache tag for the content object; and
in response to an expiration timestamp for the cache tag expiring, reverting back from utilizing the cache tag to utilizing the default cache tag.

9. The method of claim 1, comprising:
creating a new query parameter specifying the override cache tag.

10. The method of claim 9, wherein the modified subsequent request comprises the new query parameter.

11. A non-transitory machine readable medium having stored thereon processor-executable instructions that when executed cause performance of operations, the operations comprising:
receiving, at a first proxy hop, a request from a client device for a content object originating from a content source;
executing a cache tagging script to add a query parameter specifying a cache tag version for the content object to the request to create a modified request;
transmitting the modified request through one or more subsequent proxy hops to the content source to retrieve the content object;
caching the content object, tagged with a cache tag specifying the cache tag version, as a cached content object within a cache, wherein the cache tag is associated with an expiration timestamp after which the cached content object is designated to be invalid; and
in response to receiving, at the first proxy hop, a subsequent request for the content object:
determining a request Uniform Resource Locator (URL) of the content object included in the subsequent request; and
executing a cache tag configuration override script to (i) perform a lookup of a tuple by the request URL of the subsequent request and (ii) tag the subsequent request with an override cache tag to create a modified subsequent request, wherein the tuple for which the lookup was performed by executing the cache tag configuration override script comprises a starting timestamp of when a cache tag override should apply, a duration of the cache tag override, and a cache tag override value.

12. The non-transitory machine readable medium of claim 11, wherein the operations comprise:
caching the content object, with the cache tag specifying the cache tag version, as the cached content object at caches associated with the one or more subsequent proxy hops.

13. The non-transitory machine readable medium of claim 12, wherein the operations comprise:
in response to determining that a newer version of the content object is available from the content source, creating a new cache tag version to invalidate cached content objects at the caches associated with the one or more subsequent proxy hops based upon the cached content objects being tagged with the cache tag specifying the cache tag version.

14. The non-transitory machine readable medium of claim 11, wherein the operations comprise:
in response to receiving a request from a tenant to opt-in for utilizing a cache tagging mechanism, implementing the cache tagging script of the cache tagging mechanism and implementing the cache tag configuration override script to determine whether cache tag versions correspond to latest versions of the content object.

15. The non-transitory machine readable medium of claim 14, wherein the operations comprise:
implementing a dynamic reloading feature hosted by the first proxy hop and the one or more subsequent proxy hops to dynamically reload the cache tagging script on-demand.

16. The non-transitory machine readable medium of claim 14, wherein the operations comprise:
implementing a dynamic reloading feature hosted by the first proxy hop and the one or more subsequent proxy hops to dynamically reload the cache tag configuration override script on-demand.

17. The non-transitory machine readable medium of claim 11, wherein the operations comprise:
removing the query parameter from the modified request at a last proxy hop before the content source.

18. A computing device comprising:
a processor; and
memory comprising processor-executable instructions that when executed by the processor cause performance of operations, the operations comprising:
receiving, at a first proxy hop, a request from a client device for a content object originating from a content source;
executing a cache tagging script to add a query parameter specifying a cache tag version for the content object to the request to create a modified request;
transmitting the modified request through one or more subsequent proxy hops to the content source to retrieve the content object;
caching the content object, tagged with a cache tag specifying the cache tag version, as a cached content object within a cache, wherein the cache tag is associated with an expiration timestamp after which the cached content object is designated to be invalid; and
in response to receiving, at the first proxy hop, a subsequent request for the content object:
determining a request Uniform Resource Locator (URL) of the content object included in the subsequent request; and
executing a cache tag configuration override script to (i) perform a lookup of a tuple by the request URL of the subsequent request and (ii) tag the subsequent request with an override cache tag to create a modified subsequent request, wherein the tuple for which the lookup was performed by executing the cache tag configuration override script comprises a starting timestamp of when a cache tag override should apply, a duration of the cache tag override, and a cache tag override value.

19. The computing device of claim 18, wherein the operations comprise:
in response to determining that a newer version of the content object is available from the content source, creating a new cache tag version to invalidate cached content objects of the content object having prior cache tag versions.

20. The computing device of claim 18, wherein the operations comprise:
specifying a default cache tag for the content object; and
in response to an expiration timestamp for the cache tag expiring, reverting back from utilizing the cache tag to utilizing the default cache tag.

* * * * *